United States Patent Office 3,311,976
Patented Apr. 4, 1967

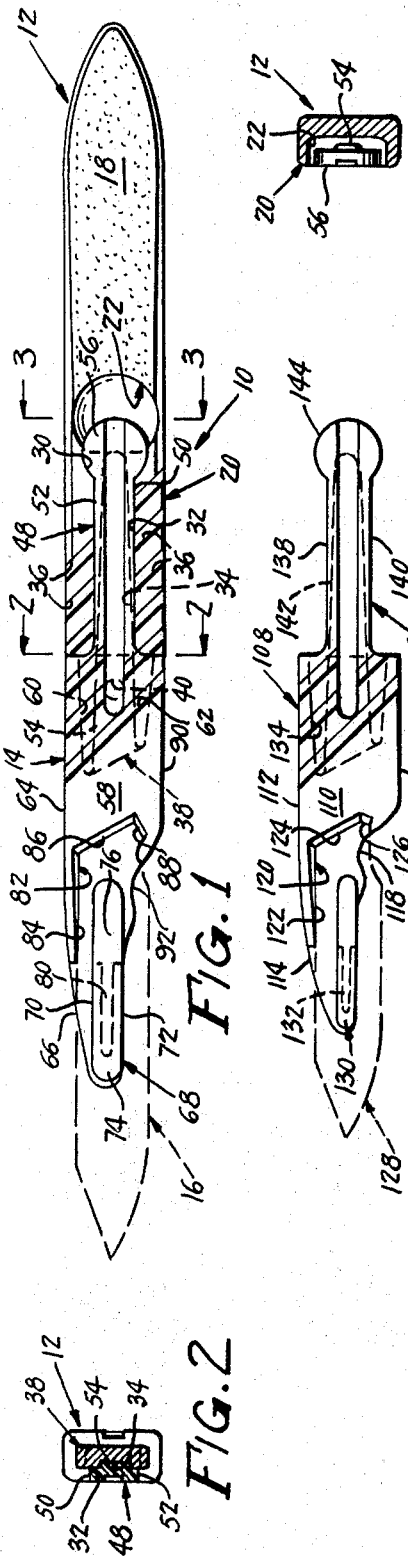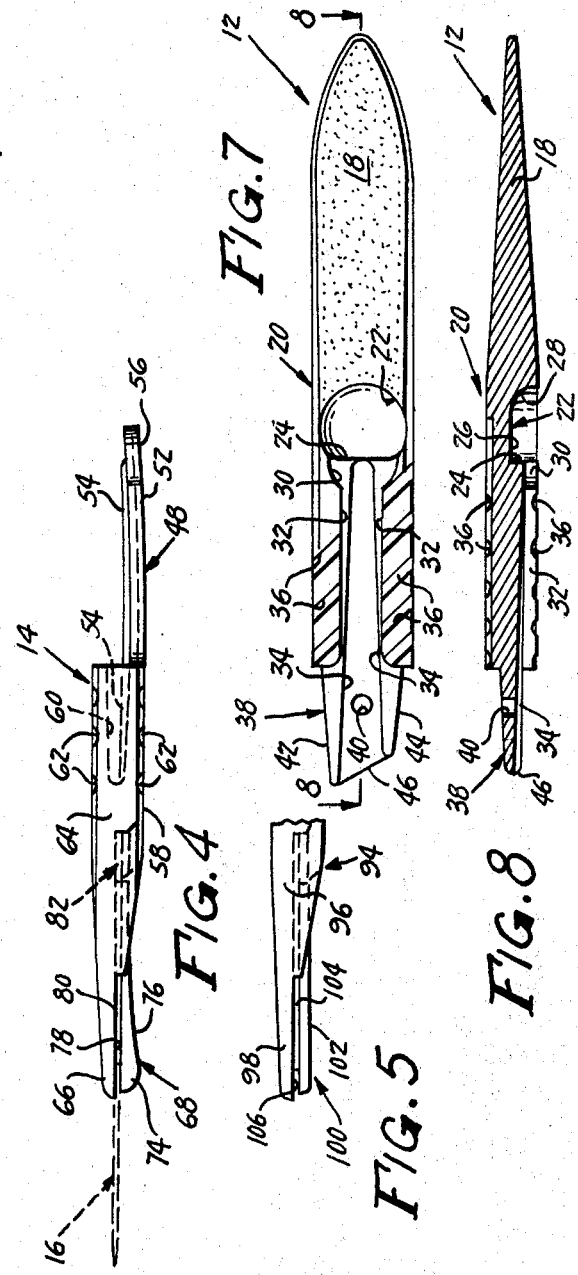

3,311,976
SCALPEL HANDLE AND DETACHABLE
BLADE HOLDER
John J. Matwijcow, 31 Charles Terrace,
New Market, N.J.
Filed Sept. 17, 1965, Ser. No. 488,176
3 Claims. (Cl. 30—335)

This invention relates to scalpels, and more particularly to a universal scalpel handle and blade holder therefor.

At present there are two general sizes of scalpels, which for the sake of convenience may be termed "large" and "small." The large scalpel is provided with a large handle, a large blade holder and a large blade while the small scalpel is equipped with the same components manufactured on a smaller scale. In general, the scalpel handles are made of metal in order to provide sufficient weight and "feel" while the blade holder is customarily made of plastic. It will be seen that there are necessarily two fully divergent incompatible sets of components by which a scalpel is assembled.

Another difficulty with preexisting scalpel handles is the difficulty of removing a blade holder that is conventionally secured thereto. One method of overcoming this difficulty is shown in my prior Patent No. 2,960,769 which discloses an arm having an enlarged portion on the end thereof for close-fitting engagement within a recess in a scalpel handle, an aperture being provided communicating with this recess such that a probe or the like may be used to disengage the connection between the handle and the blade holder. Although this form of engagement has provided satisfactory results, the instant invention is deemed an improvement thereover as more fully explained hereinafter.

An object of the instant invention is to provide a scalpel handle adapted to receive blade holders of various sizes such that a single scalpel handle may be used in assembling scalpels of varying sizes.

Another object of the instant invention is to provide a method of assembling scalpels such that a single size scalpel handle may be used to assemble scalpels of different sizes.

Another object of the instant invention is to provide a scalpel handle having means facilitating the removal of an attached blade holder.

A more specific object of this invention is to provide a scalpel handle having an enlarged recess therein receiving a smaller interconnecting means of a blade holder such that an individual may use a finger nail to remove the blade holder from the scalpel handle.

Other objects and advantages of the instant invention reside in the combinations of elements, arrangements of parts, and features of construction and operation, all as will be more fully pointed out hereinafter and disclosed in the accompanying drawing wherein there are shown preferred embodiments of this inventive concept.

In the drawings:

FIGURE 1 is a side elevational view of a scalpel consisting of a scalpel handle, a blade holder and a blade, the blade being indicated in dotted lines;

FIGURE 2 is a transverse cross-sectional view of the scalpel handle of FIGURE 1 taken along line 2—2 and viewing in the direction of the arrows;

FIGURE 3 is another transverse cross-sectional view of the scalpel handle of FIGURE 1 taken along line 3—3 thereof and viewing in the direction of the arrows;

FIGURE 4 is a top plan view of a blade holder and blade of the instant invention, the blade being shown in dotted line;

FIGURE 5 is a top plan view of another form of blade holder of the instant invention, certain parts being broken away for clarity of illustration;

FIGURE 6 is a side elevational view of still another form of blade holder of the instant invention of generally the same configuration as the blade holder shown in FIGURES 1, 4 and 5, but of a reduced scale;

FIGURE 7 is a side elevational view of the scalpel handle which may be used with any of the blade holders of FIGURES 1, 4, 5 and 6; and FIGURE 8 is a longitudinal cross-sectional view of the scalpel handle of FIGURE 7 taken along line 8—8 and viewing in the direction of the arrows.

Referring now to the drawing in detail, wherein like reference characters designate like elements throughout the several views thereof, there is indicated generally at 10 a scalpel consisting of a scalpel handle designated generally at 12, a blade holder shown generally at 14 and a blade indicated generally at 16.

Handle 12 is preferably metallic and while it may be machined to the proper shape, casting is preferred for economic production. Handle 12 includes a thin rear portion 18 rearwardly tapering in cross-sectional configuration, as may be seen in FIGURE 8, provided with a suitably arcuate rear edge, as may be seen in FIGURES 1 and 7. Handle 12 also includes a central second portion shown generally at 20 providing an enlarged recess designated generally at 22 which, in side elevation, as may be seen in FIGURE 7, describes a major portion of a circle and which in cross-section provides an abutment 24 substantially perpendicular to a longitudinal plane through the narrow top and bottom surfaces of handle 12. Recess 22 also includes a substantially flat bottom surface 26 which merges into a smoothly arcuate section 28.

Central enlarged portion 20 of handle 12 forms a smaller recess 30 which, in side elevation, describes a segment of a circle overlapping recess 22 as may be seen in FIGURE 7. Smaller aperture 30 communicates with the forward end of central portion 20 through a substantially straight slot 32 having a centrally disposed forwardly diverging groove 34 therein to receive a complementarily shaped tongue. Central portion 20 of handle 12 also includes a plurality of diagonally extending grooves 36 providing a roughened surface to facilitate grasping of handle 12, with roughened or stippled rear portion 18 providing a non-glare finish.

Handle 12 also includes a forwardly extending tongue shown generally at 38 integral with and projecting from central body portion 20 with tongue 38 being forwardly converging in cross-sectional configuration to be received within a corresponding slot of blade holder 14 as more fully described hereinafter. Tongue 38 carries an extension of groove 34, as may be seen in FIGURES 7 and 8, with an aperture 40 being provided within groove 34 and extending throughout the width of tongue 38 so that blade 12 may be conveniently plated by attaching a string or the like through aperture 40 and dipping blade 12 into a suitable plating bath.

It should be noted that tongue 38 provides upper and lower forwardly converging edges 42, 44 and a front edge 46 that is upwardly inclined when handle 12 is in the operating position. It will be seen that the angular relationships of edges 42, 44, 46 will effect a more secure engagement than a tongue having a perpendicular leading edge.

Blade holder 14 has a rearwardly extending shank indicated generally at 48 adjacent one side thereof providing substantially straight upper and lower edges 50, 52 spaced apart to reside within groove 32 of handle 12 and an inwardly facing tongue 54 increasing in thickness toward the blade end of blade holder 14 to fit within groove 34 of handle 12. Shank 48 is equipped with a circular enlarged portion 56 of a size to fit within recess 30 and overlap recess 22 as may be seen in FIGURE 1.

Blade holder 14 also includes a main body portion 58 forming a centrally disposed groove 60 complementarily configured to tongue 38 and a plurality of diagonal grooves 62 on the outer surface thereof for providing a roughened surface in much the same manner that diagonal grooves 36 provide a roughened surface on central enlarged portion 20 of handle 12.

Main body portion 58 provides an upper surface 64 substantially aligned with the upper surface of handle 12 at the rear of main body portion 58 and which forms a smoothly downwardly curving forward edge 66. A longitudinal boss shown generally at 68 extends substantially throughout the length of forward edge 66 having upper and lower straight edges 70, 72 and providing a forwardly disposed bulbous tip 74 extending to one side of main body portion 58. Bulbous tip 74 connects with a smoothly arcuate lateral face 76 of boss 68 to provide a convenient means upon which a surgeon's thumb may be placed to steady scalpel 10.

Disposed between longitudinal boss 68 and forward edge 66 of main body portion 58 is a groove or slot 78 in which blade 16 resides. Connecting boss 68 to forward edge 66 is a transversely extending connecting member 80 having a forward thin section within slot 78 and an enlarged rearward section.

Main body portion 58 also includes a forwardly opening pocket shown generally at 82 including a top substantially straight edge 84 intersecting a rearwardly downwardly inclined edge 86 which in turn intersects a forwardly downwardly inclined wall 88. Pocket 82 is configured to conform to the rearward configuration of blade 16 and thereby provides a rear abutment means to facilitate the securement of blade 16 on blade holder 14.

Main body portion 58 of blade holder 14 includes a bottom edge 90 substantially aligned with the bottom edge of handle 12 as seen in FIGURE 1 with bottom wall 90 forming an inwardly concave section 92 between boss 68 and the rear of pocket 82. As will be seen more fully hereinafter, inwardly concave section 92 provides a convenient access for the thumb of an individual whereby blade 16 may be removed from pocket 82 and out of slot 78.

Surgical blade 16 is of conventional shape having a centrally disposed slot that may be received longitudinal boss 68 and leading edge 66 of blade holder 14 all as is described in United States Patent No. 2,877,553. It should be noted that the rear end of blade 16 is configured to reside in pocket 82 to provide an additional support against rearward movement thereof with arcuately concave section 92 providing a convenient means for pivoting the rear end of blade 16 out of pocket 82.

Referring now to FIGURE 5, another form of blade holder is shown generally at 94 having main body portion 96 which, in plan, is substantially identical to that shown in FIGURE 1, including a leading edge 98. A longitudinal boss shown generally at 100 is positioned substantially throughout the length of leading edge 98 having a substantially planar lateral surface 102. Longitudinal boss 100 is spaced from leading edge 98 by a brace 104 of similar configuration to member 80 in FIGURE 1 such as to provide a blade receiving slot 106 into which blade 16 may be positioned in the manner previously indicated. It will be seen that the only difference between blade holder 94 and blade holder 14 resides in longitudinal boss 100 upon which a surgeon's thumb may rest for purposes of stability.

Referring now to FIGURE 6, there is shown generally at 108 another form of blade holder, which is of similar configuration to blade holders 14, 94, but which is substantially smaller in that its dimension along the longitudinal axis thereof is substantially less than blade holders 14, 94. Blade holder 108 includes a main body portion 110 having an upper surface 112, the forward end of which is smoothly, downwardly curved providing a leading edge 114. Main body portion 110 is also provided with a bottom edge 116 which forms an inwardly concave section 118 in a position similar to section 92 on blade holder 14. It will be seen that the width and thickness of blade holder 108 are substantially identical with blade holders 14, 94 such that blade holder 108 may be positioned upon handle 12 to provide a unitary member as more fully explained hereinafter.

Main body portion 108 forms a forwardly facing pocket shown generally at 120 providing an upper substantially linear edge 122 intersecting a downwardly rearwardly inclined edge 124 which in turn intersects a forwardly downwardly inclined edge 126 for receiving the rear end of a similarly configured surgical blade shown generally at 128.

Longitudinal boss shown generally at 130 extends substantially throughout the extent of forward edge 114, and may be configured in the arcuate configuration of longitudinal boss 68 or the planar configuration of boss 100. Longitudinal boss 130 is spaced from main body portion 110 by a brace 132 thus providing a blade receiving slot in which surgical blade 128 may be mounted.

Disposed centrally of the rear of main body portion 110 is a tongue receiving slot 134 of identical configuration with slot 60 of blade holder 14 for receiving tongue 38 of handle 12. Extending from one side of main body portion 110 is a shank shown generally at 136 having upper and lower edges 138, 140 spaced apart to be received by slot 32 of handle 12. Positioned on the back side of shank 136 is a tongue 142 of identical configuration with tongue 54 of blade holder 14 which may be received in slot 34 of handle 12 as previously explained.

Positioned on the terminal end of shank 136 is an enlarged portion 144, which is illustrated as circular to be closely received by recess 30 of handle 12. It should be understood that the configuration of enlarged portions 56, 144 and the configuration of recess 30 may be altered to provide any convenient interlocking set of parts. It should also be noted that the rearward end of shanks 48, 136 are slightly inclined toward the longitudinal axis of blade holders 14, 108 to provide a slight resilient action facilitating the engagement of enlarged portions 56, 144 in recess 30 of handle 12.

Blade 128 is of conventional configuration having the longitudinal slot to be received by boss 130 with the rear end thereof configured to reside in forwardly facing pocket 120. Blade 128 is generally identical with blade 16 except that it is considerably shorter. From a comparison of FIGURES 1 and 6, it will be seen that the assembly of blade 128 and blade holder 108 is considerably smaller than the assembly of blade 16 and blade holder 14. Since shank 136 of blade holder 108 is substantially identical with shank 48 of blade holder 14, it will be seen that handle 12 constitutes a universal handle for both blade holders thus rendering unnecessary two completely divergent incompatible components for assembling a scalpel.

Since blade holders 14, 94, 108 are conventionally made of plastic while handle 12 is conventionally made of metal, it will be seen that a plurality of different sized scalpels may be assembled from one expensive metal handle when sequentially coupled with a plurality of varying sized blade holders and blades.

In assembling scalpel 10, a suitable handle 12 is selected from a group of previously sterilized handles. A suitably sized presterilized blade holder and blade are selected with the attachment of the blade being effected as previously described. The blade holder is attached to the scalpel handle by inserting tongue 38 of handle 12 within the correspondingly shaped slot in the rear of the selected blade holder.

The enlarged portion at the terminal end of the blade holder shank slides across central portion 20 of handle 12 immediately above slot 32 and, when the enlarged portion becomes aligned with recess 30, the inwardly biasing resilient nature of shank 48 or 136 biases the enlarged portion thereof into close fitting engagement with recess 30 of handle 12. After a surgical operation has been performed, the blade holders may be removed from engagement with handle 12 by placing the finger nail within recess 22 and under the enlarged portion residing in recess 30 and pulling upwardly thereon to release the engagement therebetween. It will be seen that this is a much more expedient means of releasing this connection than that disclosed in my previous Patent 2,960,769 wherein a wire probe is necessary to effect the separation of a similar recess and enlarged fitting portion.

The blade affixed to the associated blade holder may be removed by placing the thumb within the arcuately concave portion of the blade holder and biasing the rearward end of a blade outwardly to disengage its securement in the slot formed between the forward edge of the blade holder and the associated longitudinal boss.

Each of the components may be sterilized and, if desired, the used blade may be resharpened, and replaced in the sterile containers from which components may be selected to assemble a scalpel.

Since there are two general size scalpels presently in use, a subsequent assembly of a scalpel will secure together the previously used handle and a blade and blade holder of different size, although because of the random assembly of components this may not occur until handle 12 has been repeatedly used. A different sized blade and blade holder may be selected and assembled in the manner previously indicated and, after a surgical operation, may be disassembled, resterilized, and replaced in the sterile bins from which scalpel assembly components are selected.

It is now seen that there is herein provided an improved scalpel having all of the advantages of this invention and others, including many advantages of great practical utility and commercial importance.

Since many embodiments may be made of the instant inventive concept, and since many modifications may be made of the embodiments hereinbefore shown and described, it is to be understood that the foregoing is to be interpreted merely as illustrative and not in a limiting sense.

I claim:

1. In combination a scalpel handle and a detachable blade holder; said scalpel handle comprising an elongated body having a squared end, a tongue extending longitudinally from the center of said squared end defining opposed shoulders, said body having an elongated tapered groove extending from said squared end longitudinally to an intermediate point, said groove terminating in a first recess, said first recess communicating with an aligned concaved second recess, said body having a second groove at the bottom thereof and extending into said tongue, said second groove tapering inwardly towards said intermediate point, said blade holder comprising an elongated tapered member having a squared end defining shoulders abutting said first mentioned shoulder and a socket receiving said tongue, a shank extending from one side of said squared end and seating in said groove, said tongue having an enlarged end seating in said first recess and overlying a portion of said second recess whereby to permit the engagement of a fingernail into the concavity beneath said enlarged portion to lift the same out of said first recess and permit longitudinal disengagement of said blade holder from said handle as said tongue on said handle is removed from its associated socket, said tongue on said blade holder having a raised tapered ridge on the face thereof adjacent said groove, said ridge conforming in configuration to and seating in said second groove, and means on said blade holder for releasably securing a blade thereto.

2. The structure of claim 1 wherein the blade securing means includes a blade receiving slot and a longitudinally extending undercut boss adapted to be received in the slot of a slotted blade, said blade holder tapering inwardly toward said boss includes a bulbous tip, tapering rearwardly towards said handle, the taper of said blade holder and the forward portion of said bulbous tip providing a concaved recess for the reception of a user's thumb.

3. The structure of claim 1 wherein said blade holder includes a bottom edge forming an arcuately concave section below and slightly rearwardly of said boss, and a depending convex portion forwardly of said concave section, said concave section defining a recess to permit grasping of the blade by the thumb and forefinger to facilitate removal of the blade, and said convex portion affording additional lateral stability to the blade during use.

References Cited by the Examiner

UNITED STATES PATENTS

| 387,409 | 8/1888 | Gay et al. | 279—102 |
| 1,563,674 | 12/1925 | Stuart | 30—339 X |
| 2,257,141 | 9/1941 | Waugh | 30—339 |
| 2,960,769 | 11/1960 | Matwijcow | 30—340 |

FOREIGN PATENTS

| 275,816 | 8/1927 | Great Britain. |
| 846,877 | 8/1960 | Great Britain. |

WILLIAM FELDMAN, *Primary Examiner.*

G. WEIDENFELD, *Assistant Examiner.*